United States Patent
Schiele et al.

(12) 
(10) Patent No.: US 6,485,393 B2
(45) Date of Patent: Nov. 26, 2002

(54) METHOD FOR CONTROLLING A VEHICLE DRIVE SYSTEM

(75) Inventors: Peter Schiele, Kressbronn (DE); Georg Gierer, Kressbronn (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/931,116

(22) Filed: Aug. 16, 2001

(65) Prior Publication Data

US 2002/0022548 A1 Feb. 21, 2002

(30) Foreign Application Priority Data

Aug. 19, 2000 (DE) .......................................... 100 40 657

(51) Int. Cl.[7] .............................................. B60K 41/04
(52) U.S. Cl. ...................................... 477/109; 477/904
(58) Field of Search ................................. 477/109, 904, 477/905

(56) References Cited

U.S. PATENT DOCUMENTS

| 4,338,666 | A | * | 7/1982 | Suzuki et al. | |
| 5,505,671 | A | | 4/1996 | Streib et al. | 477/115 |
| 5,765,117 | A | * | 6/1998 | Horiguchi | 701/51 |
| 5,794,170 | A | * | 8/1998 | Kuroda et al. | 701/93 |
| 5,813,942 | A | * | 9/1998 | Nakagawa et al. | 477/120 |
| 6,269,293 | B1 | * | 7/2001 | Correa et al. | 701/51 |
| 6,368,249 | B1 | * | 4/2002 | Hubbard | 477/121 |

FOREIGN PATENT DOCUMENTS

| DE | 33 34 711 A1 | 4/1985 | ......... B60K/41/00 |
| DE | 43 29 916 A1 | 3/1995 | ......... B60K/41/06 |
| EP | 0 230 735 A2 | 8/1987 | ......... B60K/41/08 |
| WO | 91/02662 | 3/1991 | ......... B60K/41/08 |

* cited by examiner

Primary Examiner—Dirk Wright
(74) Attorney, Agent, or Firm—Davis & Bujold, P.L.L.C.

(57) ABSTRACT

A method is proposed for the control and regulation of a drive system of a motor vehicle having one electronic transmission control for an automatic transmission and connected therewith an electronic engine control for a prime mover. In a coasting operation of the drive system, during a change over of a transmission element from an open to a closed or a slipping state during a coupling procedure of the transmission or a regulation procedure of the transmission element, rotary masses of the engine are regulated and accelerated under control so that a vehicle deceleration is less than a presettable tolerance value.

16 Claims, 2 Drawing Sheets

METHOD FOR CONTROLLING A VEHICLE DRIVE SYSTEM

FIELD OF THE INVENTION

The invention concerns a method for control and regulation of the drive system of a motor vehicle.

BACKGROUND OF THE INVENTION

Drive systems known from the practice each comprise a prime mover and a mechanical or automatic transmission situated between the prime mover and the output of a motor vehicle. The drive system usually has an electronic control system to make available the most comfortable possible mode of operation of the drive system to the driver which, together with other control units, comprises an electronic transmission control, such as for an automatic transmission, and connected therewith an electronic engine control for a prime mover via adequate interfaces.

The function of electronic transmission controls of automatic transmissions is to unburden the driver and, in so doing, select an optimal ratio for the existing driving situation in regard to consumption, performance and comfort. The electronic transmission control mainly carries out the selection of the most favorable gear and the control of the shifting cycle, the selection being performed according to different parameters. One such parameter for this is constituted by the engine torque which, in the control systems known from the practice, can be directly relayed to the electronic transmission control and used for gear selection. Alternatively to this, the torque can be separately determined also from other measured values fed to the engine, such as the throttle valve position or the air mass. The driving situation, the kind of gear change and the road speed are further taken into account when effecting the pressure control of the clutches of the transmission and their adaptation to the torque to be transmitted. In this manner, the control system engages with good shifting comfort the appropriate gear according to the transmission output rotational speed and the engine load optionally under self-adaptive accommodation to the driving style of a driver and existing traffic situation.

In gear shifts, that is, in a gear change or change over from a neutral position to a certain ratio of the transmission, distinction is made according to the existing operating point in coasting or braking shifts, the same as in load shifts. As load shifts are designated here all shifts in a power flow from the prime mover to the output of a motor vehicle while braking or coasting shifts designate all shifts where the input results from the potential or kinetic energy of the vehicle going from the output of the vehicle toward the engine.

However, in the already known drive systems, a control of a gear shift in the coasting operation often proves uncomfortable, especially since when initiating a shift at high road speeds in the coasting operation, an engine rotational speed is lower than a transmission rotational speed and a restoration of the power flow of the drive train of the drive system results in a not inconsiderable deceleration of the vehicle. The deceleration of the vehicle is caused by the need of kinetic energy for acceleration of the rotatory masses of engine and transmission.

Besides, in the coasting operation there occurs over an engaging clutch a consideration loading of the clutch due to the high acceleration of the rotatory masses of the engine, since to prevent damages to comfort, the admissible vehicle deceleration that appears is limited and the limitation is adjusted by a prolongation of the gridding time of the engaging clutch.

The problem on which this invention is based is to provide a method for control and regulation of a drive system of a motor vehicle having an electronic transmission control for an automatic transmission with which method a vehicle deceleration in the coasting operation can be limited during a gear shift and at the same time a load of the clutch can be considerably reduced.

SUMMARY OF THE INVENTION

With the inventive method, in which the rotatory masses of the engine are regulated and/or accelerated under control to limit a deceleration of the vehicle in a coasting operation of the drive system, the acceleration energy needed can be advantageously applied by the engine itself.

By the inventive positive engagement of the engine, it is also possible during a change over of a transmission element from an open to a closed or a slipping state in a coupling operation of the transmission and/or a regulation operation of the transmission element in the coasting operation, to advantageously adjust an applicable curve of the vehicle deceleration wherein the vehicle deceleration can be retained approximately below a presettable tolerance value to implement a very comfortable shifting behavior.

By virtue of the inventive regulated and/or controlled acceleration of the rotatory masses of the engine during the coupling procedure of the transmission or the regulating procedure of the transmission element, additionally there results the possibility of implementing an applicable deceleration increase in such a manner that a driver with otherwise great shifting comfort perceives the deceleration as feedback of the vehicle and a power flow of the drive system or of the drive train is again produced between an output of the vehicle and the engine.

By virtue of the regulated and/or controlled accelerations of the rotatory masses of the engine in the coasting operation during a coupling procedure of the transmission, there further results the advantage that coupling procedures in the coasting operation can be carried outing a large rotational speed range, especially even at high rotational speeds of the output, without reduction of the driving comfort.

One other advantage is that a coupling procedure of the transmission or a regulating procedure of the transmission element also means no reduction of the driving safety, since a jack-knifing of the vehicle resulting from too great a deceleration of the speed can be eliminated by a uniform, especially limited, deceleration of the vehicle even in special programs such as a winter drive program.

The expression "transmission element" used here stands for a shiftable clutch which to produce or increase the power flow in the drive system is closed, brought to a slipping state or opened. By the expression "transmission element" is further to be understood also a regulated lock-up clutch of a converter of an automatic transmission which likewise is changed over from open to closed or slipping state according to the existing operating situation of the drive system.

Taking into consideration this interpretation of the expression "transmission element", there further results the advantage that with the inventive method much shorter shifting times with simultaneous increased driving comfort can be implemented during coupling or gear initiation, the same as during a regulation procedure of the lock-up clutch.

BRIEF DESCRIPTION OF THE DRAWINGS

Other advantages and advantageous embodiments of the invention will now be described, by way of example, with reference to the accompanying drawings in which.

DETAILED DESCRIPTION OF THE INVENTION

Figure 1:
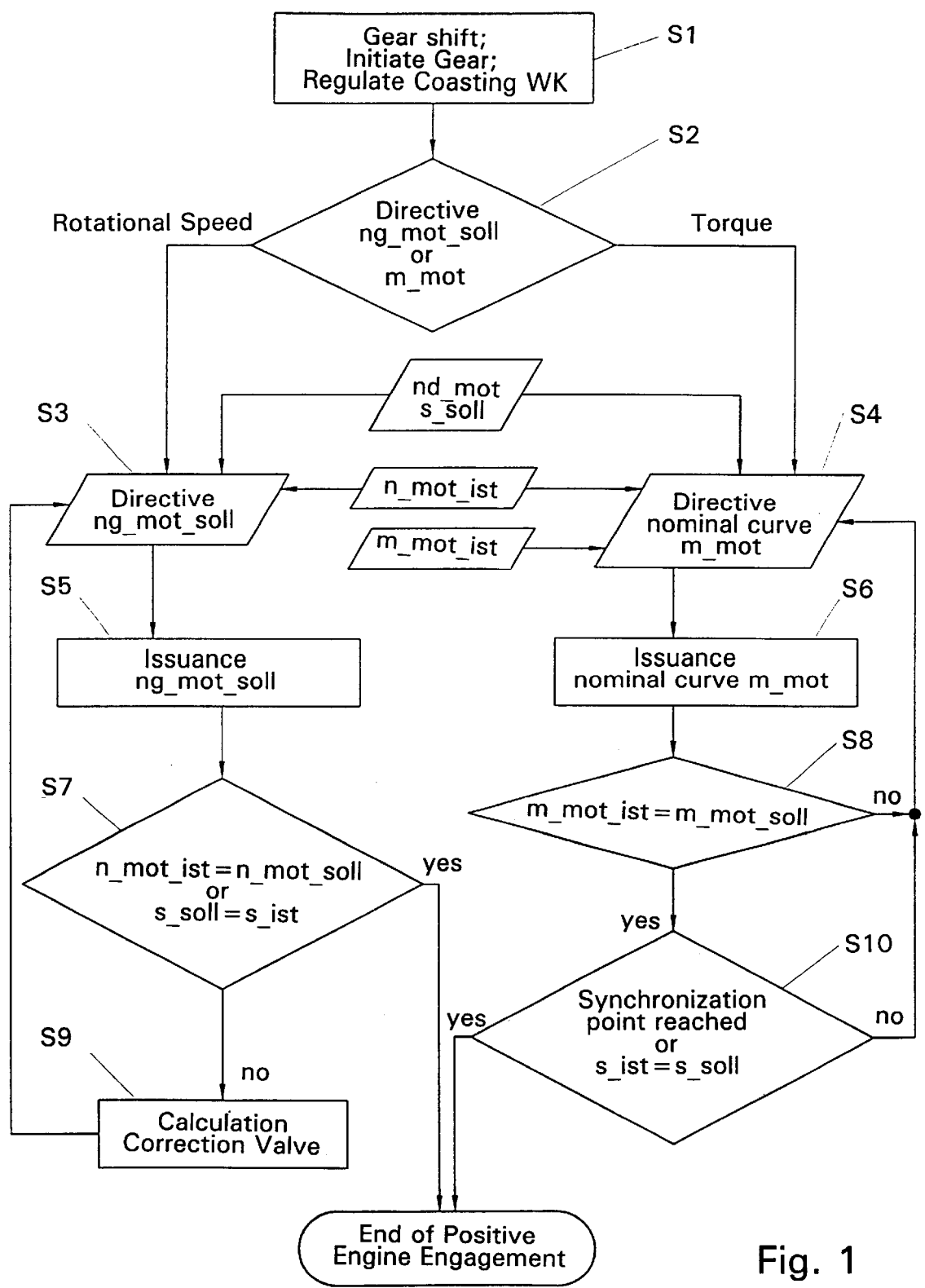
FIG. 1 is a flow chart of the inventive method.

FIG. 1 shows a flow chart of a method for control and regulation of a drive system of a motor vehicle having one electronic transmission control for an automatic transmission and connected therewith by signal technology an electronic engine control for a primer mover. The prime mover is designed in this embodiment as an internal combustion engine, it is possible to use the method also in an engine designed as electric machine, or also in a combination of an internal combustion engine and an electric machine.

In a coasting operation of the drive system, during a change over of a transmission element from an open to a closed or a slipping state in a coupling procedure of the transmission, rotary masses of the engine are regulated and accelerated under control in a manner such that a vehicle deceleration occurring therein is below a preset tolerance value. In addition, the method can be used in a regulating procedure of the transmission element in order to limit the vehicle deceleration in a coasting operation in relation to a tolerance value.

The transmission element mentioned is a shiftable clutch or a regulated lock-up clutch of a converter, the description that follows of the procedure for carrying out the method being referred for the sake of simplicity to the manner of operation of a shift clutch, the described mode of operation or performance of the method being accordingly applied to a regulated lock-up clutch.

In a first step S1 of the flow chart of FIG. 1, it is first tested whether, in general, a gear shift must be carried out or whether, on the basis of a specified driver's wish, a gear should be initiated in the automatic transmission. As other start criterion of the method, it is tested in step S1 whether there is a signal having as consequence a regulating procedure or a tuning procedure of the clutch during a coasting operation.

In case of a positive result of the test in step S1, in a second step S2 is examined with reference to a differentiation function whether the electronic engine control connected by signal technology with the electronic transmission control does or dos not support a positive engine engagement by directing a nominal value of a gradient ng_mot_soll of the engine rotational speed or of a nominal curve of an engine torque m_mot.

According to the configuration of the electronic engine control, depending on the directive mode selected to accelerate the rotary masses of the engine, the electronic transmission control issues a directive of the nominal value of the gradient ng_mot_soll of the engine rotational speed or of the nominal curve of the engine torque m_mot to the electronic engine control with the object that, when adjusting the preset nominal values, there is at least approximately reached a synchronization point relative to the rotational speeds of the engine and of the automatic transmission or of the output.

The directive of the nominal value of the gradient ng_mot_soll of the engine rotational speed or of the nominal curve of the engine torque m_mot takes place in steps S3 or S4 joined up to step S2.

In the directive or calculation of the nominal value of the gradient ng_mot_soll of the engine rotational speed and of the nominal curve of the engine torque m_mot enter an actual value m_mot_ist of the engine rotational speed, a differential rotational speed nd_mot between the actual value n_mot_ist of the engine rotational speed and a synchronous value n_mot_syn of the engine rotational speed, the same as an eventually existing specified driver's wish. The synchronous value n_mot_syn of the engine rotational speed represents the value at which the engine rotational speed n_mot at least approximately corresponds to a transmission input rotational speed.

Alternatively to the directive of the differential rotational speed nd_syn, the directive of the electronic transmission control can result according to a nominal slip value s_soll of the clutch or of the lock-up clutch.

After the directive or the calculation of the nominal value of the gradient ng_mot_soll or of the nominal curve of the engine torque n_mot, there respectively results in steps S5 and S6 the issuance of the determined or calculated nominal values, there additionally entering in the directive or calculation of the nominal curve of the engine torque m_mot an actual value m_mot_ist of the engine torque, an eventually existing specified driver's wish, inertia moments of the rotatory masses of the engine and of the automatic transmission, the same as a ratio existing in the automatic transmission.

Following the issuance of the nominal value of the gradient ng_mot_soll or of the nominal curve of the engine torque m_mot, in steps S7 and S8, there respectively a test takes place as to the extent to which the directive or calculation of the nominal value of the gradient ng_mot_soll of the engine rotational speed or of the nominal value curve of the engine torque m_mot or of the nominal slip value s_soll has been reached.

The test of step S7 results in that if an existing actual value n_mot_ist of the engine rotational speed corresponds to a nominal value n_mot_soll of the engine rotational speed or an existing actual slip value s_ist is equal to the nominal slip value s_soll, the method, i.e. the positive engine engagement, is completed. On the contrary, if it is established that divergences exist between the actual value n_mot_ist of the engine rotational speed or the actual value s_ist of the slip of the clutch and the nominal values n_mot_soll or s_soll, in a step S9 a correction value is calculated with which a renewed directive of the nominal value of the gradient ng_mot_soll of the engine rotational speed is carried out. With this newly determined nominal value ng_mot_soll of the gradient of the engine rotational speed, the loop for setting an engine rotational speed n_mot_soll is again run through.

If it is found in the test of step S8 that an actual value of the engine torque m_mot_ist diverges from the sought nominal value m_mot_soll of the engine torque, starting from step S8, it is branched back to before step S4 and a new nominal curve of the engine torque m_mot is calculated and preset.

If the existing actual value n_mot_ist of the engine torque is at least approximately equal to the nominal value n_mot_soll of the engine torque to be set, in a step S10 is tested whether the synchronization point of the engine and of the automatic transmission has been reached or whether a currently established actual value s_ist of the slip corresponds to the nominal slip value s_soll to be adjusted.

If the result of the test in step S10 is that the synchronization point between the engine and the automatic transmission still has not been reached or the existing actual value s_ist of the slip of the clutch does not correspond to the preset nominal slip value s_soll, the same as in a negative test result of step S8, branching back to before step S4 is effected and a nominal curve of the engine torque m_mot is again calculated the values of the input parameters corresponding to the actual operating points of the engine and of the automatic transmission according to the previously mentioned input parameters.

However, if the test in step S10 results in that the synchronization point has been reached or an existing actual value s_ist of the slip is equal to the nominal slip value s_soll, the positive engine engagement or the method is completed.

Figure 2:
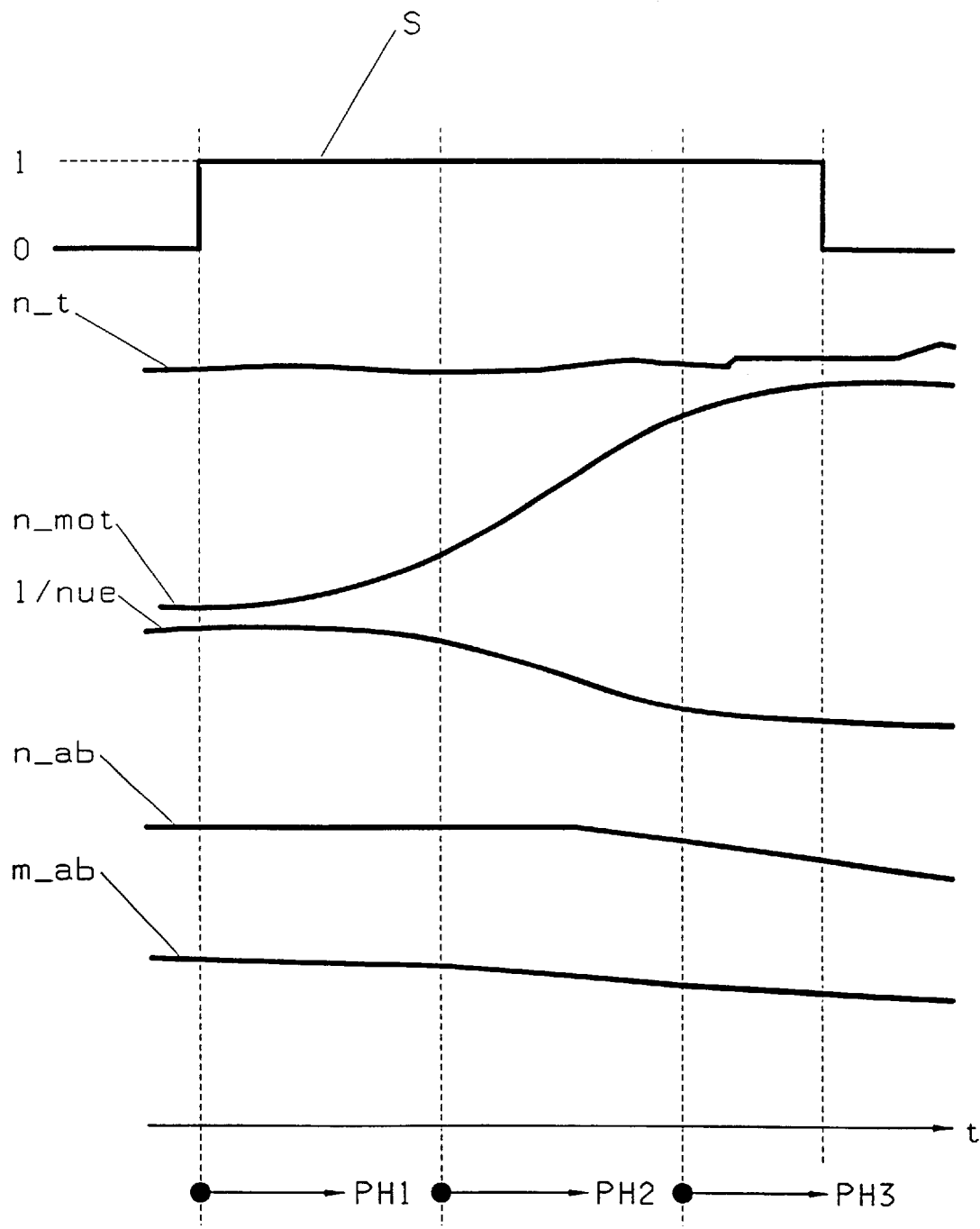
FIG. 2 is another embodiment of the inventive method according to FIG. 1 wherein are shown extensive schematic pressure rotational speed curves during a regulated and controlled acceleration of the rotary masses of an engine during a regulating procedure of a transmission element in coasting operation.

In FIG. 2 are extensively shown schematized pressure and rotational speed curves in a regulated and controlled acceleration of the rotary masses of the engine during a regulation procedure of a regulated lock-up clutch in the coasting operation.

The duration in time of the regulation procedure from the beginning thereof is shown with a line "S", where the line "S" that symbolizes a shifting signal springs from a value "0" to a value "1" over a time t, until the end of the gear shift in which the line "S" jumps back again to the value "0".

Like shown with a line "n_t" for the turbine rotational speed of a converter serving as starting element in the automatic transmission and a line "n_mot" for the engine rotational speed, the turbine rotational speed n_t remains almost constant during the regulation procedure while the engine rotational speed is continuously increased to a nominal value n_mot_soll.

With one other line, "1/nue", the preset nominal rotational speed ratio of the engine nominal rotational speed n_mot to the turbine rotational speed n_t of the converter is shown which represents a reciprocal value to the quotient usually designated as rotational speed characteristic value "nue" between the turbine rotational speed n_t and the engine rotational speed n_mot. The rotational speed ratio 1/nue is preset and follows during the gear shift an applied specified nominal value depending on its starting value.

As is to be understood from FIG. 2, in a first embodiment represented with the solid lines "n_mot", "1/nue", "n_ab" and "m_ab", the ratio 1/nue of the engine rotational speed n_mot_soll to the turbine rotational speed n_t of the converter is preset as a constant value, as is also to be understood from the uniform distance of the lines "n_t" and "n"mot" in a first phase PH1 of the gear shift. At the beginning of the regulation procedure, the nominal engine rotational speed n_mot_soll is determined from a coasting characteristic field of the converter to the turbine rotational speed n_t of the converter, according to the preset ratio 1/nue of the engine nominal rotational speed n_mot. Since the turbine rotational speed n_t is not changeable in the multi-step automatic transmission here concerned, in order to maintain a uniform rotational speed ratio, the engine rotational speed n_mot is changed according to the rotational speed ratio 1/nue in conformity with the constant value preset for this. At the same time, in a second phase PH2 of the gear shift, the rotatory masses of the engine are now accelerated so that their acceleration energy suffices, in a third phase PH3 of the gear shift, to accelerate the rotatory masses to the synchronous rotational speed of the gear to be initiated at the synchronization point. The control for this is effected so that the electronic transmission control issues to the electronic engine control the required engine rotational speed n_mot_soll which is processed by the electronic engine control in a manner known in order to relay corresponding commands to the actuators of the prime mover.

Due to the setting of a constant rotational speed ratio 1/nue of the engine nominal rotational speed n_mot to the turbine rotational speed n_t of the converter, a vehicle deceleration results according to the coasting characteristic field of the converter, as is to be understood from the curves for the progress of the output rotational speed n_ab of the output torque m_ab in the second phase PH2 of the gear shift. Depending on the directive of the value for the rotational speed ratio 1/nue, an applicable deceleration increase is possible during the gear shift in the coasting operation.

In the variant of the method according to FIG. 2, it is further presupposed as comfort criterion that the engine rotational speed n_mot be always lower than the turbine rotational speed n_t, since thereby the drive train is surely in the coasting operation and it is also ensured during very short shifting times that no flank change occurs in the gear wheel pairs from the push to the pull flank with correspondingly unpleasant accompanying noises. This obviously can also be applicatively changed in the sense that the engine rotational speed n_mot, e.g. in a sport program, can also exceed the turbine rotational speed n_t for a short time at the synchronization point.

While in the embodiment described in FIG. 2, the inventive method is implemented via a directive of the nominal engine rotational speed n_mot_soll by the electronic transmission control to the electronic engine control, it also can be provided diverging form this that to the electronic engine control a nominal engine torque m_mot_soll be preset, only an additional calculation step being necessary here to set the nominal engine rotational speed n_mot_soll. Both kinds of directives can be calculated from the converter characteristic field and sent to the electronic engine control correspondingly processed.

To obtain a quicker adaptation of the engine rotational speed n_mot to the turbine rotational speed n_t, it can be alternatively provided, in the second phase PH2 of the regulation procedure, to vary the rotational 1/nue of engine nominal rotational speed n_mot to the turbine rotational speed n_t of the converter, the value of the rotational speed ratio 1/nue being calculated according to the coasting characteristic field of the converter reproduced in the pattern.

With an adequate increase of the rotational speed ratio 1/nue in the second phase PH2 of the regulation procedure which, in turn, is obtained by an adequate change of the nominal engine rotational speed n_mot_soil, it is possible to obtain a significantly greater increase of the engine rotational speed n_mot and to maintain the vehicle deceleration almost constant. In this manner can be implemented an output torque neutral downshift in the coasting operation or a freely applicable deceleration curve.

When the inventive method is used for accelerating the rotatory masses of a combustion engine, the corresponding actuators of the combustion engine are controlled by the electronic engine control so that the combustion engine is raised to the preset engine rotational speed n_mot_soll, via a regulated or controlled firing.

If the driving aggregate or the engine consists of a combination of one combustion engine and one electric machine, the regulated and controlled acceleration of the engine is implemented, via a control of the corresponding actuators of the electric machine or of a regulated and controlled firing of the combustion engine, the method is also suited for use of an electric machine alone.

References m_ab output torque
m_mot engine torque, nominal curve of the engine torque
m_mot_ist actual value of the engine torque
m_mot_soll nominal value of the engine torque
n_ab output rotational speed
nd_mot differential rotational speed
ng_mot_soll nominal value of the gradient of the engine rotational speed
n_mot_syn synchronization value of the engine rotational speed
n_mot nominal engine rotational speed
n_t turbine rotational speed
nue rotational speed ratio of the turbine rotational speed of the engine rotational speed
1/nue regulated nominal rotational speed ratio during downshift in the coasting operation
PH1 first phase of the downshift
PH2 second phase of the downshift
PH3 third phase of the downshift
S characteristic line for gear shift active/inactive
S1–S10 step
s_ist actual value of the slip
s_soll nominal slip value
t time

What is claimed is:

1. A method for control and regulation of a drive system of a motor vehicle having an electronic transmission control for an automatic transmission and connected therewith an electronic engine control for a prime mover, wherein in a coasting operation of the drive system, during a change over of a transmission element from an open to a closed or a slipping state in one of a coupling procedure of the transmission and a regulation procedure of the transmission element, rotatory masses of the engine are regulated under control in a manner such that a vehicle deceleration is less than a presettable tolerance value.

2. The method according to claim 1, wherein to accelerate said rotatory masses of the engine, the electronic transmission control issues to the electronic engine control a directive of a nominal value of a gradient (ng_mot_soll) of one of the engine rotational speed and of a nominal curve of an engine torque (m_mot) so that at least approximately a synchronization point of the engine and of the automatic transmission has been reached.

3. The method according to claim 2, wherein said electronic transmission control is directed according to an actual value (n_mot_ist) of the engine rotational speed.

4. The method according to claim 2, wherein said electronic transmission control is directed according to a nominal slip value (s_soll) of said transmission element.

5. The method according to claim 2, wherein the nominal curve of the engine torque (m_mot) is determined according to an actual value (m_mot_ist) of the engine torque and/or of a specified driver's wish.

6. The method according to claim 2, wherein in determining the nominal curve of the engine torque (m_mot) there are taken into account inertia moments of the rotatory masses of the engine and of the automatic transmission, the same as a ratio existing in the automatic transmission.

7. The method according to claim 2, wherein the nominal value of the gradient (ng_mot_soll) of the engine rotational speed or the nominal curve of the engine torque (m_mot) results according to a differential rotational speed (nd_mot) between the actual value (n_mot_ist) of the engine rotational speed and a synchronous value (n_mot_syn) of the engine rotational speed.

8. The method according to claim 2, wherein after issuance of the nominal value (n_mot_soll) of the engine rotational speed or of the nominal curve of the engine torque (m_mot), the transmission control tests whether the synchronization point of the engine and of the automatic transmission or of the nominal slip value (s_soll) of the transmission element exists at least approximately.

9. The method according to claim 8 wherein in case of divergences from the synchronization point, the nominal value of the gradient (ng_mot_soll) of the engine rotational speed or of the nominal curve of the engine torque (m_mot) is again determined, which is done taking into account an actual operation point of the engine and of the automatic transmission.

10. The method according to claim 8, wherein the method is completed when the synchronization point is present.

11. The method according to claim 2, wherein the nominal value of the gradient (nd_mot_soll) of one of the engine rotational speed and of the nominal curve of the engine torque (m_mot) is adjusted according to a presettable ratio (1/nue) of the nominal value (n_mot_soll) of the engine rotational speed to a turbine rotational speed (n_t) of a transmission element designed as converter.

12. The method according to claim 11, wherein at the start of one of a coupling procedure of the transmission and of a regulation procedure of the transmission element, the nominal value of the gradient (nd_mot_soll) of the engine rotational speed or the nominal curve of the engine torque (m_mot) is determined from a coasting characteristic field of the converter according to the presettable ratio (1/nue) of the nominal value (n_mot_soll) of the engine rotational speed and of the turbine rotational seed (n_t) of the converter.

13. The method according to claim 11, wherein the ratio (1/nue) of the nominal value (n_mot_soll) of the engine rotational speed to the turbine rotational speed (n_t) of the converter during the coupling procedure of the automatic transmission or the regulation procedure of the converter in the coasting operation results according to the starting value of an applicable specified nominal value.

14. The method according to claim 11, wherein to adjust an increase of the vehicle deceleration during one of the coupling procedure of the automatic transmission andr the regulation procedure of the converter in a coasting operation, a constant value is issued for the ratio (1/nue) of the nominal value (n_mot_soll) of the engine rotational speed to the turbine rotational speed (n_t) of the converter.

15. The method according to claim 11, wherein to adjust a constant output torque (m_ab) or a constant output torque gradient during the coupling procedure of the automatic transmission or the regulation procedure of the converter during the coasting operation, a value is issued for the ratio (1/nue) of the nominal value (n_mot_soll) of the engine rotational speed to the turbine rotational speed (n_t) of the converter which value is calculated according to the coasting characteristic field of the converter reproduced in the pattern.

16. The method according to claim 11, wherein to implement a comfort operation, the nominal value (nd_mot_soll) of the gradient of the engine rotational speed is preset so that the value is less than the value of the turbine rotational speed (n_t).

* * * * *